(12) United States Patent
Griesmeier et al.

(10) Patent No.: US 8,998,762 B2
(45) Date of Patent: Apr. 7, 2015

(54) PLANETARY TRANSMISSION

(75) Inventors: Uwe Griesmeier, Markdorf (DE); Stephan Scharr, Friedrichshafen (DE); Bernd Vahlensieck, Markdorf (DE); Stefan Beck, Eriskirch (DE); Christian Sibla, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/347,486

(22) PCT Filed: Aug. 2, 2012

(86) PCT No.: PCT/EP2012/065150
§ 371 (c)(1),
(2), (4) Date: May 21, 2014

(87) PCT Pub. No.: WO2013/045143
PCT Pub. Date: Apr. 4, 2013

(65) Prior Publication Data
US 2014/0248987 A1 Sep. 4, 2014

(30) Foreign Application Priority Data

Sep. 27, 2011 (DE) .......................... 10 2011 083 507
Jul. 13, 2012 (DE) .......................... 10 2012 212 257

(51) Int. Cl.
*F16H 3/72* (2006.01)
*H02K 7/116* (2006.01)
(Continued)

(52) U.S. Cl.
CPC ........ *H02K 7/116* (2013.01); *B60K 6/48* (2013.01); *F16H 3/725* (2013.01);
(Continued)

(58) Field of Classification Search
None
See application file for complete search history.

(56) References Cited

U.S. PATENT DOCUMENTS 6,709,358 B2 * 3/2004 Raghavan et al. ............ 475/275
7,294,079 B2 * 11/2007 Raghavan et al. ................ 475/5
(Continued)

FOREIGN PATENT DOCUMENTS

DE   10 2004 040599 A1   3/2006
DE   10 2007 005438 A1   8/2008
(Continued)

OTHER PUBLICATIONS

German Search Report from corresponding DE Application No. 10 2012 212 257.5, dated Feb. 11, 2014 (German Language) (5 pages).
(Continued)

*Primary Examiner* — Dirk Wright
(74) *Attorney, Agent, or Firm* — Brinks Gilson & Lione

(57) ABSTRACT

The invention relates to a planetary transmission for a hybrid drive of a motor vehicle, having three coupled planetary gear sets, having numerous shift elements, and having at least one electric machine, to which a shaft inside the transmission is allocated, wherein, with a first planetary gear set, the ring gear can be connected to a component permanently attached to the housing, and the planet carrier is connected in a driving manner to the ring gear of a second planetary gear set, wherein, with the second planetary gear set, the planet carrier is connected to the ring gear of a third planetary gear set, and the sun gear can be powered by a transmission input shaft, and wherein, with the third planetary gear set, the planet carrier is connected to a transmission output shaft. In order that the planetary transmission has a compact structure and is cost-effective in terms of its production, and is efficient in terms the operation thereof, it is provided that the sun gear of the first planetary gear set is connected to the component permanently attached to the housing, and that the sun gear of the third planetary gear set can be connected to the component permanently attached to the housing and to the ring gear of the first planetary gear set.

17 Claims, 4 Drawing Sheets

Figure 1:
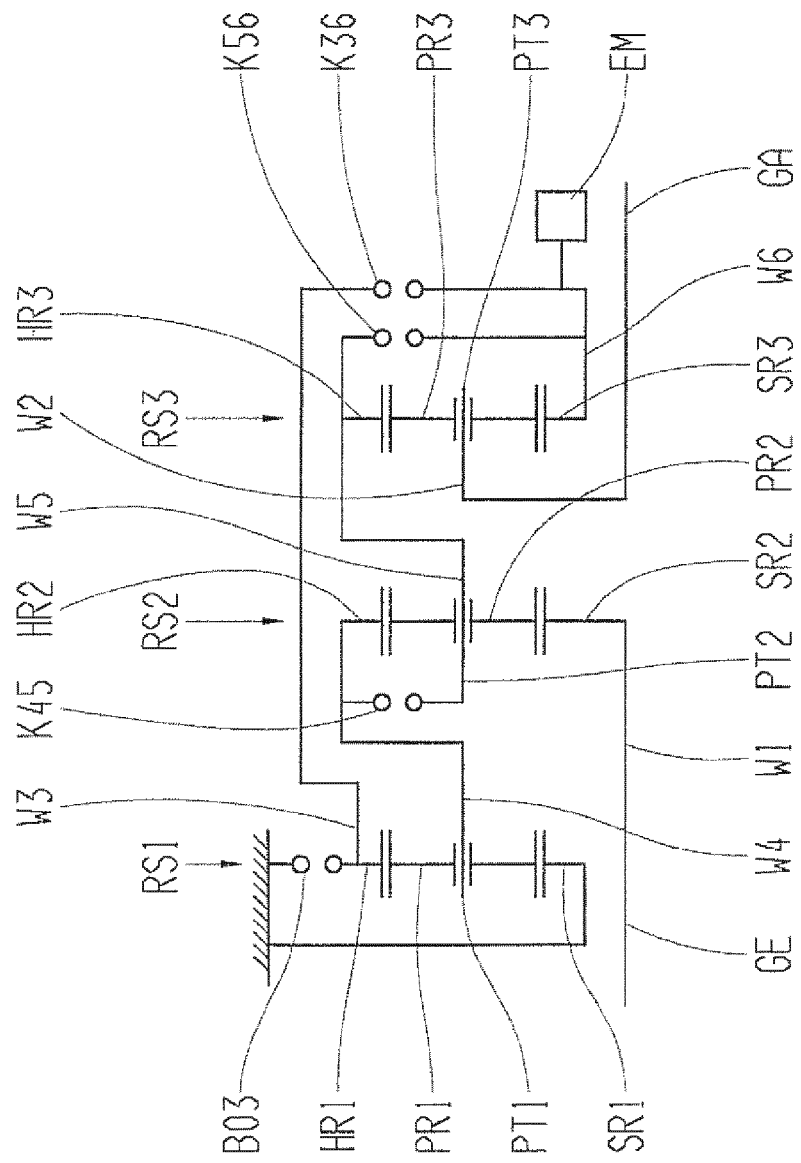

(51) Int. Cl.
*B60K 6/48* (2007.10)
*F16H 3/66* (2006.01)
*F16H 3/62* (2006.01)

(52) U.S. Cl.
CPC .......... *B60K 2006/4816* (2013.01); *F16H 2200/0047* (2013.01); *F16H 2200/201* (2013.01); *F16H 2200/2041* (2013.01); *F16H 2200/2064* (2013.01); *F16H 2200/2097* (2013.01); *Y02T 10/6221* (2013.01); *Y02T 10/6256* (2013.01); *F16H 3/66* (2013.01); *F16H 3/62* (2013.01)

(56) References Cited

U.S. PATENT DOCUMENTS

| | | | | |
|---|---|---|---|---|
| 7,341,535 B2 * | 3/2008 | Usoro | ................................ | 475/5 |
| 7,468,014 B2 * | 12/2008 | Usoro | ................................ | 475/5 |
| 7,591,750 B2 * | 9/2009 | Bucknor et al. | ................... | 475/5 |
| 2003/0054917 A1 | 3/2003 | Raghavan et al. | | |
| 2012/0178568 A1 * | 7/2012 | Schoenek et al. | ................. | 475/5 |
| 2013/0267366 A1 * | 10/2013 | Mellet et al. | ...................... | 475/5 |

FOREIGN PATENT DOCUMENTS

WO    WO 2008/138723 A1    11/2008
WO    WO 2013045143 A1 *    4/2013    ................ F16H 3/66

OTHER PUBLICATIONS

International Search Report from corresponding International Patent Application PCT/EP2012/065150, dated Oct. 17, 2012 (English Language).

International Search Report and Written Opinion from corresponding International Patent Application PCT/EP2012/065150, dated Oct. 17, 2012 (German Language).

\* cited by examiner

|      | -1,785 |
|------|--------|
| i_RS1 |       |
| i_RS2 | -2,076 |
| i_RS3 | -1,600 |

Fig. 2a

|         | B03 | K36 | K45 | K56 | i     | φ     |
|---------|-----|-----|-----|-----|-------|-------|
| 1. Gang | x   | x   |     |     | 4,998 | 1,625 |
| 2. Gang | x   |     |     | x   | 3,076 | 1,762 |
| 3. Gang |     | x   |     | x   | 1,746 | 1,746 |
| 4. Gang |     |     | x   | x   | 1,000 | 1,216 |
| 5. Gang |     | x   | x   |     | 0,823 | 6,074 |

Fig. 2b

PLANETARY TRANSMISSION

The invention relates to a planetary transmission according to the preamble of claim 1.

A planetary transmission having numerous planetary gear sets and numerous shift elements is known from DE 10 2007 005 438 A1, with which an electric machine is in an operational connection with one of the planetary gear sets by means of its rotor, in order to reinforce a torque applied to the planetary gear set for implementing a transmission ratio. A drive shaft and an output shaft of the transmission are disposed coaxially to one another, such that the input drive and output drive are diametrically opposed and the electric machine is disposed coaxially to the two shafts. The electric machine radially encloses the planetary gear set allocated to it, wherein the rotor of the electric machine is firmly connected to a ring gear of the enclosed planetary gear set. The ring gear can be connected via a form locking shift element to a component permanently attached to the housing. A stator of the electric machine is connected to the component permanently attached to the housing, which encloses the transmission, including the electric machine. The shift elements of the of the planetary transmission are designed as friction clutches and friction brakes or as claw clutches and claw brakes, which can be actuated by means of a suitable actuator system, such as an electric motor, for example. With three planetary gear sets and four shift elements, two of which are designed as shifting clutches, and two of which are designed as shifting brakes, a total of six forward gear stages and one reverse gear can be implemented.

During a shifting operation, the electric machine replaces a friction locking power shift element of a conventional planetary transmission, designed with friction clutches and friction brakes. The torque of the electric machine is transferred for this purpose to a transmission output shaft that can be connected to the output drive of a hybrid drive train of a motor vehicle. In order to keep the dimensions of the electric machine as small as possible, the torque that is to be reinforced by the electric machine can be limited by means of a temporary reduction of the drive torque of an internal combustion engine of the hybrid drive. Shiftings free of tractive force interruptions can be executed with an appropriate activation of the actuators for the shift elements pertaining thereto, making use of the electric machine, wherein the synchronization of the respective shift elements occurs by means of the electric machine. Furthermore, known hybrid functions, such as electric start-up, a pure electric driving mode, a recuperation mode, as well as a boost mode, are possible.

Planetary transmissions of this type may be provided, in particular, for vehicles having a hybrid drive or a so-called range extender electric drive. For this, however, until now a somewhat smaller portion of the components of the transmission are incorporated in the radial interior structural space of the electric machine, or the electric machine is disposed laterally on the transmission, resulting in a greater component related complexity being required, and a greater structural length, or friction shift elements are used in the transmission in a planetary transmission, despite the electric machine incorporated therein, which cause relatively high drag losses.

Based on this, the invention addresses the objective of presenting a planetary transmission of the type described in the introduction, which has a compact structural shape, is cost-effective in terms of its production, and functions efficiently.

The means for attaining this objective is obtained from the features of the independent Claim, while advantageous embodiments and further developments of the invention can be derived from the dependent Claims.

The invention takes into account that, with a compact planetary transmission, numerous coupled planetary gear sets can be incorporated in the radial interior structural space of an electric machine, which is disposed on a shaft inside a transmission housing, and is connected in a suitable manner directly to transmission components. In a parallel hybrid drive train, having an internal combustion engine and an electric machine, it is possible, with an appropriate actuation of the electric machine by means of a coupling of the electric machine with the transmission drive, to maintain the tractive force of the drive train and to synchronize the shift elements during all of the shiftings executed during the internal combustion engine operating mode. Furthermore, the electric machine can be used for other functions, such as an electric start-up without a supplementary start-up element, a purely electrical drive without a supplementary decoupling element for the internal combustion engine, or for starting the internal combustion engine, starting from a purely electrical drive mode. For the electric start-up and the starting of the internal combustion engine by means of the electric motor, no supplementary start-up or disengagement element is required. For the pure electric operation, moreover, no supplementary decoupling element is necessary for the internal combustion engine.

Accordingly, the invention is based on a planetary transmission for a hybrid drive train of a motor vehicle, having three coupled planetary gear sets, having numerous shift elements and having at least one electric machine, which is allocated to a shaft within the transmission, wherein, with a first planetary gear set, the ring gear can be connected to a component in the housing, and the planet carrier is connected in an operational manner to the ring gear of a second planetary gear set, wherein, with the second planetary gear set, the planet carrier is connected to the ring gear of a third planetary gear set, and the sun gear can be driven by a transmission input shaft, and wherein, with the third planetary gear set, the planet carrier is connected to a transmission output shaft. In order to attain the specified objective, it is furthermore provided that, with this planetary transmission, the sun gear of the first planetary gear set is connected to the component permanently attached to the housing, and the sun gear of the third planetary gear set can be connected to the component permanently attached to the housing as well as to the ring gear of the first planetary gear set.

As a result of this configuration, the planetary transmission is created with a particularly compact structural shape, which can, for example, be integrated in a hybrid drive train or a range extender electric drive train. This planetary transmission enables a purely electric driving operating mode, insofar as the rotor of the electric machine is disposed such that it can be connected to the transmission output shaft, and the internal combustion engine can be decoupled from the drive train.

In particular, it is possible to obtain a short axial length of the drive train, consisting of the transmission and the electric machine, by means of incorporating two or more planetary gear sets and one or more shift elements in the radial structural space of the electric machine. Additional housings or laterally protruding housing components are thus not needed for the electric machine. The electric machine can be entirely disposed within a housing for the transmission. Spur gear steps for the attachment of the electric machine to the drive train can be omitted, having a beneficial effect on the efficiency of the drive in an electric driving operating mode. The expanded axial covering of transmission components also results in a favorable acoustic shielding of gear teeth noises, such that the transmission can function in a particularly quiet manner, and thus provide for a comfortable driving experience.

With a transmission structure according to the invention, three planetary gear sets may be present, which can be shifted in order to implement at least five forward gear stages, which can be shifted to without interruptions of the tractive force, by means of four unsynchronized shift elements. For this, the planetary gear sets comprise, in each case, a central sun gear, a radial outer ring gear, and a planet carrier for guiding numerous planetary gears disposed between the sun gear and the ring gear. Furthermore, three of the shift elements are designed as form locking shifting clutches, and one of the shift elements is designed as a form locking shifting brake. The component complexity is thus relatively low.

The planetary transmission presented herein can also, or alternatively, be characterized by other features, which have a positive effect on the compactness, the assembly costs and the shifting functions. Insofar as a connectivity of transmission components is provided for thereby, this connectivity can be accomplished by means of the already specified shift elements that can be actuated by means of supplementary forces.

Thus, it may be provided that, with the second planetary gear set, the ring gear can be connected to the planet carrier, with the third planetary gear set, the ring gear can be connected to its sun gear, and with the first planetary gear set, the planet carrier can be connected to the transmission input shaft.

Furthermore, it can also, or alternatively, be provided that, with the second planetary gear set, the planet carrier can be connected to the transmission input shaft, with the third planetary gear set, the ring gear can be connected to its planet carrier, and with the third planetary gear set, the ring gear can be connective to the transmission output shaft.

Moreover, it can also, or alternatively, be provided that, with the third planetary gear set, the sun gear can be connected to the transmission output shaft, with the third planetary gear set, the sun gear is connected to the rotor of the electric machine, with the second planetary gear set, the planet carrier can be connected to the transmission input shaft, and the transmission input shaft is disposed coaxially within the transmission output shaft, and its input end is located at the same end of the transmission as the transmission output shaft.

According to another further development, it can be provided that the electric machine radially encloses at least two of the three planetary gear sets and at least one of the shift elements, wherein one of the planetary gear sets connected to the transmission output shaft is operatively connected, or can be operatively connected, to that shaft to which the electric machine is allocated. The electric machine can radially enclose and axially overlap, thereby, the second and third planetary gear sets of a total of three planetary gear sets, which face toward the transmission output shaft, wherein the shaft allocated to the electric machine is the shaft connected to the sun gear of the third planetary gear set, or a shaft connected to the sun gear of the third planetary gear set.

The enclosure of the at least two planetary gear sets can be readily obtained in that the shaft of one of the two planetary gear sets, allocated to the electric machine, is designed in the manner of a pot in its longitudinal section, and is covered by the adjacent rotor or stator of the electric machine, or is operatively connected thereto, respectively, and the other components of the two planetary gear sets are disposed within this pot-shaft.

The electric machine can have an internal rotor or an external rotor design, thus exhibiting a rotor disposed radially internally, or radially externally. As a result, the drive configuration can more easily be adapted to existing structural spatial conditions.

As a rule, an additional electric machine can also be coupled to the planetary transmission. In particular, if a transmission input shaft is inserted over its full length through the transmission, then the second electric machine can be disposed on the free end of this transmission input shaft, and be connected thereto in a drive effective manner.

The transmission design can be put in concrete terms in that with the first planetary gear set, the sun gear is connected to a component permanently attached to the housing, the ring gear can be connected to the component permanently attached to the housing, this ring gear can be coupled to the sun gear of the third planetary gear set, and the plant carrier is connected to the ring gear of the second planetary gear set, with the second planetary gear set, the sun gear is connected to a transmission input shaft, the planet carrier can be coupled to the ring gear of the second planetary gear set, and the planet carrier is connected to the ring gear of the third planetary gear set, and with the third planetary gear set, the ring gear can be coupled to the sun gear of the third planetary gear set, and the planet carrier is connected to a transmission output shaft. The transmission output shaft is disposed thereby such that it is coaxially, as well as axially, adjacent to the transmission input shaft.

With these transmission designs, with the aid of the electric machine, the tractive force can be maintained in all shifting operations. As a result, drag losses are reduced or prevented. As a result, a start-up clutch or a torque converter having a bypass clutch can be omitted. Depending on the design of the transmission, all, or at least most, of the shift elements can be designed as claw shift elements. The production costs can be significantly reduced thereby, in comparison with conventional planetary transmissions, and the necessary structural space for the shift elements can be reduced in size.

It is possible, with the aid of the electric machine, to execute a start-up procedure, wherein the transmission ratio for a first internal combustion engine start-up gear may be used for the start-up gear using the electric motor. A change from the start-up gear for the electric motor to the first and second gears of the internal combustion engine is possible.

Furthermore, with the present transmission design, in addition to the shiftable forward gear stages, maintaining tractive force, a shifting, tractive force interrupting, electrically operable gear can be employed, having a low gearing.

The transmission structure enables a flexible configuration of the shift elements, in order for the actuators to be able to take up as little space as possible for their actuation, and to be able to be readily implemented in the transmission. In particular, those shift elements provided for interlocking the individual planetary gear sets can be disposed such that they have the same effect, but are, however, in different positions.

This can be implemented with the aforementioned transmission design in that with the second planetary gear set, instead of a shiftable clutch between the planet carrier and the ring gear, a shiftable clutch is provided between the planet carrier and the sun gear, or a shiftable clutch is provided between the ring gear of the second planetary gear set and the sun gear, and with the third planetary gear set, instead of a shiftable clutch between the ring gear and the sun gear, a shiftable clutch is provided between the planet carrier and the ring gear, or a shiftable clutch is provided between the planet carrier and the sun gear.

Furthermore, to this extent it may be necessary to dispose freewheels, which act with respect to other shafts or housing parts.

In order to be able to obtain a configuration that is particularly suitable for a front-transverse installation in a vehicle, the transmission input shaft of the transmission can be disposed to the side of the transmission output shaft.

This can be put in concrete terms according to another embodiment of the invention, in that, with the first planetary gear set, the sun gear is connected to a component permanently attached to the housing, and the ring gear can be connected to the component permanently attached to the housing, and with the second planetary gear set, the sun gear is connected to a transmission input shaft, the ring gear is connected to the planet carrier of the first planetary gear set, and the planet carrier can be coupled to the sun gear, and with the third planetary gear set, the sun gear can be coupled to the output shaft and can be coupled to the ring gear of the first planetary gear set, the ring gear is connected to the planet carrier of the second planetary gear set, and the planet carrier is connected to the output shaft. The transmission input shaft is disposed coaxially within the transmission output shaft thereby, and its input end is located at the same end of the transmission as the transmission output shaft. The input end of the transmission output shaft is understood thereby to be that end of this shaft, with which this shaft is, or can be, connected to an internal combustion engine.

Figure 3:
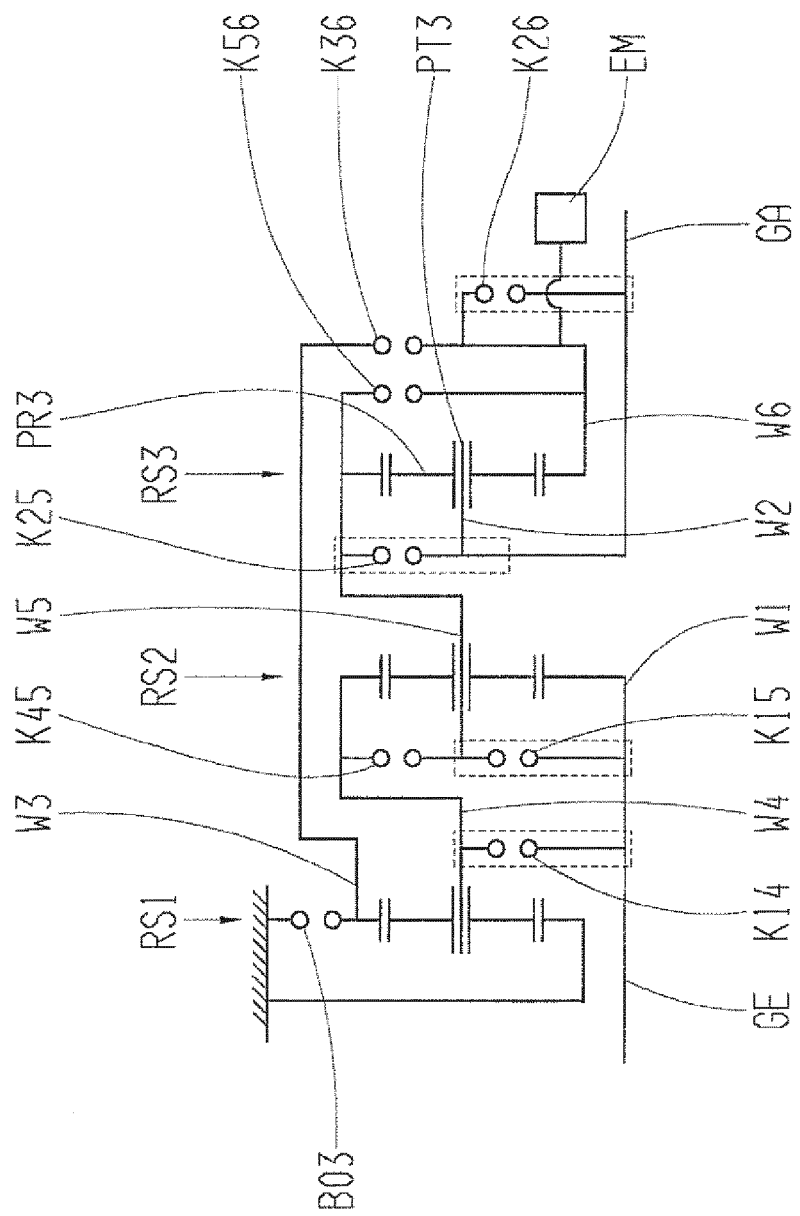
Figure 4:
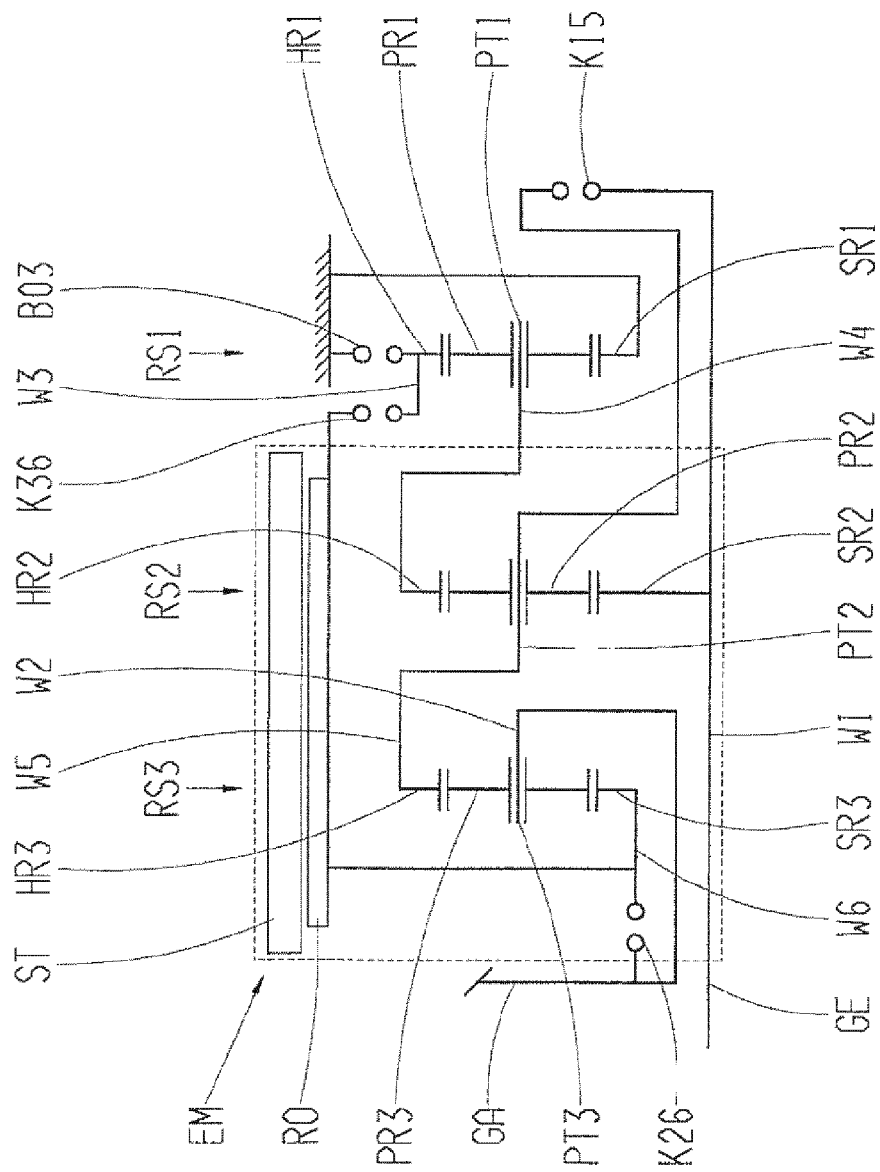

In order to clarify the invention, the description is accompanied by drawings showing three embodiment examples. Shown are:

FIG. 1 a gear pattern for a planetary transmission having three planetary gear sets and an electric machine, FIG. 2a a transmission ratio table of the planetary gear sets for the transmission in FIG. 1, FIG. 2b a shifting table for the transmission in FIG. 1, FIG. 3 the gear pattern in FIG. 1 with alternative shift element configurations added, and FIG. 4 a second embodiment of a planetary transmission having an electric machine according to the invention.

For purposes of simplification, components having the same function or effect are provided with the same reference symbols in the figures. In each case, an upper or lower half of a longitudinal section of the respective gear pattern is depicted.

Accordingly, FIG. 1 shows a planetary transmission for a hybrid drive train of a motor vehicle, comprising three simple planetary gear sets RS1, RS2, RS3 and four shift elements B03, K45, K56, K36, wherein the shift elements B03, K45 and K35[sic] are designed as claw shift elements, while the shift element K56 can be designed as a claw shift element or a power shift element, in particular a friction shift element. For clarification, the descriptions of the shift elements are made in conjunction with the shafts or housing parts explained below, which can be coupled to one another via the shift elements.

With a first planetary gear set RS1, a central sun gear SR1 is connected to a component permanently attached to the housing, which is not explained in greater detail. An outer ring gear HR1 can be connected to the component permanently attached to the housing by means of a shift element B03 designed as a claw brake. The ring gear HR1 can furthermore be coupled to a sun gear SR3 of a third planetary gear set RS3 via a dedicated shaft W3 and a further shaft W6. In order to implement a shiftable coupling of the ring gear HR1 of the first planetary gear set RS1 with the sun gear SR3 of the third planetary gear set RS3, a shift element K36 designed as a claw clutch is disposed between the two shafts W3 and W6. A planet carrier PT1, designed for guiding numerous planetary gears PR1 disposed between the sun gear SR1 and ring gear HR1, is connected to a ring gear HR2 of a second planetary gear set RS2 via a shaft W4.

With the second planetary gear set RS2, a sun gear SR2 is connected to a drive shaft, or transmission input shaft GE via a dedicated shaft W1. The transmission input shaft GE can be connected, or is connected, such that it can be driven, to an internal combustion engine, which is not shown. A planet carrier PT2, which guides the associated planetary gears PR2 of the second planetary gear set RS2, can be coupled to the ring gear HR2 via a shift element K45 designed as a claw clutch. The planetary gear set RS2 can be blocked by means of this coupling. Furthermore, the planet carrier PT2 is connected to a ring gear HR3 of the third planetary gear set RS3 via a shaft W5. The blocking of the second planetary gear set RS2 thus results, simultaneously, in an operative connection with the first planetary gear set RS1, and with the third planetary gear set RS3.

With the third planetary gear set RS3, the ring gear HR3 can be coupled to the sun gear SR3 of this planetary gear set RS3 via the shift element K56, which can be designed as a claw shift element or power shift element, in particular a friction shift element. A planet carrier PT3, which guides the associated planetary gears PR3 of the third planetary gear set RS3, is connected to an output shaft, or transmission output shaft GA, via a dedicated shaft W2, which can be or is connected in the manner of a drive to the driven wheels of the vehicle via a differential or similar item, which is not shown.

The transmission output shaft GA and the transmission input shaft GE are disposed coaxially as well as axially adjacent on opposite sides of the transmission.

An electric machine EM is integrated in the transmission, which is disposed coaxially to the transmission input shaft GE and the transmission output shaft GA, and is disposed inside a transmission housing, which is not shown. It partially encloses the transmission configuration. The electric machine EM is connected to the sun gear shaft W6 of the third planetary gear set RS3 such that it can be driven. This, as well as the partial radial enclosing of planetary gear sets and shift elements of the transmission, is only schematically illustrated in FIG. 1. A radial enclosing of at least two of the three planetary gear sets and at least one of the shift elements in this manner by the electric machine EM is more clearly depicted in the embodiment example shown in FIG. 4.

A table of the possible transmission ratio states for the three gear sets RS1, RS2, RS3 is shown in FIG. 2a. FIG. 2b shows a possible shift pattern for the transmission according to FIG. 1. From this, it is clear that in five forward gear stages that can be implemented, two of the shift elements B03, K36, K45, K56 are engaged in each case. The transmission ratios i for the gears and the associated gear increments φ resulting therefrom can likewise be derived from the table in FIG. 2b. The standard transmission ratios i_RS1, i_RS2, i_RS3, gear transmission ratios i and gear increments φ from FIG. 2a and FIG. 2b are only to be understood as numerical examples.

The manner in which the planetary transmission of FIG. 1 functions is as follows:

For an electrodynamic start-up (EDS mode), the shift brake B03 is engaged. The planet carrier shaft W4 for the first gear set RS1 remains immobile. At the second gear set RS2, the transmission ratio from the sun gear shaft W1 (transmission input shaft GE) to the planet carrier shaft W5 of the second gear set RS2 slows, thus approaching low output rotational speeds. A further slowing transmission ratio occurs at the third gear set RS3, wherein the electric machine EM supports a counter-torque to the torque of the sun gear SR3, suitable for the start-up.

For a shifting while maintaining the tractive force at the output drive (GA), it is possible to shift from the EDS mode to the first gear of the internal combustion engine, in that, at a zero-crossing of the rotational speed of the electric machine EM, with the brake B03 engaged, the associated shifting clutch K36 is engaged.

By engaging the likewise associated shifting clutch K56 when the corresponding shafts W5 and W6 are at the same rotational speeds, one arrives, alternatively, in the second gear from the EDS mode, when the brake B03 is engaged and the shifting clutch K36 is disengaged.

Furthermore, by means of maintaining the tractive force at the output drive via the EDS function, it is possible to shift from the direct transmission ratio i=1 of the fourth gear, in which the shifting clutches K45 and K56 of the second and third gear sets RS2, RS3 are engaged, to the low gearing i=0.823 of the fifth gear, in that, by means of a suitable rotational speed setting of the electric machine EM and the internal combustion engine, the one shift element K56 of the third gear set RS3 is disengaged, and synchronously thereto, the other shift element K36 of the third gear set RS3 is engaged.

Moreover, by means of an output drive coupling of the electric machine EM, while maintaining tractive force, it is possible to shift between all gears in which the first shifting clutch K56 of the third gear set RS3 is engaged, in that the electric machine EM maintains the respective output drive torque, and the internal combustion engine is adjusted to the respective new gear by means of a suitable control of the engine rotational speed. The gear changes in question, with the participation of the second, third or fourth gear, respectively, can be derived from the table. Thus, all gear changes can be shifted while maintaining tractive force.

A pure electrical driving mode is also possible with the first shifting clutch K56 of the third gear set RS3 engaged, insofar as the other shift elements B03, K36, K45 are disengaged, and the internal combustion engine is thus decoupled from the drive train in terms of powering said drive train. A start-up of the internal combustion engine from this state is fundamentally possible at any time, by means of engaging one of the other shift elements B03, K36, K45. Depending on the driving speed, the internal combustion engine can thus be accordingly selectively shifted to in the second gear, third gear, or fourth gear, from the electric mode of operation.

Additionally, an electric motor powered first gear having a low gearing i=2.6 (corresponding to the numerical example) can be depicted, which can be shifted to with an interruption of the tractive force. This gear is made available by engaging the shifting clutch K45 of the second gear set RS2 and the shifting brake B03.

If the shift element K56 is designed, in an alternative design, as a power shift element, in particular a friction shift element, it is possible to shift from the first gear, powered by the electric motor, having a low gearing, to a gear powered by the electric motor having a higher gearing, in a power-shift manner, i.e. maintaining the tractive force.

Furthermore, a charging mode, for charging an electric energy storage unit, is possible, in that the EDS mode is engaged, but the output drive is braked thereby, by means of an existing parking brake, for example.

FIG. 3 shows alternative possibilities for blocking the second and third gear sets RS2, RS3 of the transmission according to FIG. 1, having the same effect. Instead of the shift element K45 of the second gear set RS2, which couples the ring gear HR2 of the second gear set RS2 to the planet carrier PT2 of the first gear set RS1, a shift element K14 can be configured for a ring gear-sun gear coupling (HR2/SR2) or a shift element K15 can be configured for planet carrier-sun gear coupling (PT2/SR2) of the second gear set RS2. Accordingly, instead of the shift element K56 of the third gear set RS3, which couples the ring gear HR3 of the third gear set RS3 to its sun gear SR3, a shift element K25, which can be designed as a claw shift element or power shift element, in particular a friction shift element, can be designed for a ring gear-planet carrier coupling (HR3/PT3) of the third gear set RS3, or a shift element K26, which can be designed as a claw shift element or power shift element, in particular a friction shift element, can be configured for a planet carrier-sun gear coupling (PT3/SR3) of the third gear set RS3. Thus, in each case, three blocking possibilities for the second gear set RS2 and the third gear set RS3 are obtained.

FIG. 4 shows a planetary transmission, which makes available the same functions and effects as the transmission in FIG. 1, in which, however, the input drive and the output drive are disposed on one side of the transmission, instead of lying axially opposite one another. The transmission output shaft GA is, accordingly, disposed on the internal combustion engine input side of the transmission input shaft GE. Furthermore, the axial position of the first and third planetary gear sets RS1, RS3 in relation to the embodiment example of FIG. 1 is axially reversed.

With a first planetary gear set RS1 of this transmission, which in this case is disposed at a spacing to the internal combustion engine, a central sun gear SR1 is connected to a component permanently attached to the housing, which is not shown in greater detail. An outer ring gear HR1 can be connected to the component permanently attached to the housing via a shift element B03, designed as a claw brake. The ring gear HR1 can also be coupled to a sun gear SR3 of a third planetary gear set RS3 via a dedicated shaft W3 and a further shaft W6. To implement a shiftable coupling of the ring gear HR1 of the first planetary gear set RS1 with the sun gear SR3 of the third planetary gear set RS3, a shift element K36 designed as a claw clutch, is disposed between the two shafts W3 and W6. A planet carrier PT1, designed for guiding numerous planetary gears PR1 disposed between the sun gear SR1 and the ring gear HR1, is connected to a ring gear HR2 of the second planetary gear set RS2 via a shaft W4.

With the second planetary gear set RS2, a sun gear SR2 is connected to an input drive shaft, or transmission input shaft GE, via a dedicated shaft W1. The transmission input shaft GE can be connected, or is connected, in a driving manner to an internal combustion engine, which is not shown. A planet carrier PT2, which guides the associated planetary gears PR2 of the second planetary gear set RS2, can be connected to the sun gear SR2 of the second gear set RS2, via a shift element K15, designed as a claw clutch. The planetary gear set RS2 can be blocked by means of this coupling. Furthermore, the planet carrier PT2 is connected to a ring gear HR3 of the third planetary gear set RS3 via a shaft W5. A drive connection between the first planetary gear set RS1 and the third planetary gear set RS3 is also obtained via the ring gear HR2 and the planet carrier PT2 of the second planetary gear set RS2.

With the third planetary gear set RS3, the sun gear SR3 can be coupled to its planet carrier PT3 via a shift element K26, which can be designed as a claw shift element or a power shift element, in particular as a friction shift element. The planet carrier PT3, which guides the associated planetary gears PR3 of the third planetary gear set RS3, is connected to an output drive shaft, or transmission output shaft GA, via a dedicated shaft W2, which is, or can be, connected in a driving manner to the driven wheels of the vehicle via a differential or similar item, which is not shown.

The transmission output shaft GA, or the shaft W2 connected thereto, is disposed coaxially over the transmission input shaft GE, as well as on the same side of the transmission.

An electric machine EM is disposed coaxially over the transmission input shaft GE and the transmission output shaft GA, or the shaft W2 connected thereto. The electric machine EM has a comparatively large diameter, and radially encloses the second planetary gear set RS2 and the third planetary gear set RS3, as well as the shift element K26 of the third planetary gear set RS3. For this, the electric machine EM also extends axially over the axial structural space occupied by this transmission component. In order to enable this, the sun gear shaft W6 of the third planetary gear set RS3 is designed in the manner of a pot, such that the rotor RO or the stator ST of the electric machine EM, depending on the design of the electric machine EM as either an internal rotor machine or external rotor machine, is disposed directly on the allocated shaft W6, and is operatively connected thereto.

LIST OF REFERENCE SYMBOLS

B03 shift element, shift brake
EM electric machine
GA transmission output shaft
GE transmission input shaft
HR1 ring gear of gear set RS1
HR2 ring gear of gear set RS2
HR3 ring gear of gear set RS3
i transmission ratio
RS1 transmission ratio for RS1
i_RS2 transmission ratio for RS2
i_RS3 transmission ratio for RS3
K14 shift element, shifting clutch
K15 shift element, shifting clutch
K26 shift element, shifting clutch
K36 shift element, shifting clutch
K45 shift element, shifting clutch
K56 shift element, shifting clutch
PR1 planetary gear for gear set RS1
PR2 planetary gear for gear set RS2
PR3 planetary gear for gear set RS3
PT1 planet carrier for gear set RS1
PT2 planet carrier for gear set RS2
PT3 planet carrier for gear set RS3
$\phi$ gear increment
RO rotor of the electric machine
RS1 gear set
RS2 gear set
RS3 gear set
SR1 sun gear for the gear set RS1
SR2 sun gear for the gear set RS2
SR3 sun gear for the gear set RS3
ST stator of the electric machine
W1 shaft
W2 shaft
W3 shaft
W4 shaft
W5 shaft
W6 shaft

The invention claimed is:

1. A planetary transmission for a hybrid drive of a motor vehicle, the planetary transmission comprising:
a housing;
an electric machine with an electric machine shaft operable to connect to a transmission input shaft or a transmission output shaft;
a first planetary gear set comprising a first ring gear, a first planet carrier, and a first sun gear, where the first ring gear is operable to connect to a component permanently attached to the housing;
a second planet carrier comprising a second ring gear, a second planetary carrier, and a second sun gear, where the first planet carrier is connected in a driving manner to the second ring gear;
a third planetary gear set comprising a third ring gear, a third planet carrier, and a third ring gear, where the second planet carrier is connected to the third ring gear;
the second sun gear is operable to be powered by the transmission input shaft; and
the third planet carrier is connected to the transmission output shaft, where the first sun gear is connected to the component permanently attached to the housing, and where the third sun gear is operable to connect to the component permanently attached to the housing and to the first ring gear.

2. The planetary transmission according to claim 1, further comprising four unsynchronized shift elements, where the first planetary gear set, second planetary gear set, and third planetary gear set are operable to provide five forward gear ratios, where the four unsynchronized shift elements enable shifting among the five forward gear ratios without interrupting the tractive force; and where three of the four unsynchronized shift elements are locking shifting clutches and one of the four unsynchronized shift elements is a locking shifting brake.

3. The planetary transmission according to claim 2, where at least one of the four unsynchronized shift elements is a power shift element.

4. The planetary transmission according to claim 1 where the second ring gear is operable to connect to the second planet carrier.

5. The planetary transmission according to claim 1 where the third ring gear is operable to connect to the third sun gear.

6. The planetary transmission according to claim 1 where the first planet carrier is operable to connect to the transmission input shaft.

7. The planetary transmission according to claim 1 where the second planet carrier is operable to connect to the transmission input shaft.

8. The planetary transmission according to claim 1 where the third ring gear is operable to connect to the third planet carrier.

9. The planetary transmission according to claim 1 where the third ring gear is operable to connect to the transmission output shaft.

10. The planetary transmission according to claim 1 where the third sun gear is operable to connect to the transmission output shaft.

11. The planetary transmission according to claim 1 where the third sun gear is connected to a rotor of the electric machine.

12. The planetary transmission according to claim 1 where the second planet carrier is operable to connect to the transmission input shaft.

13. The planetary transmission according to claim 1 where the transmission input shaft is disposed coaxially inside the transmission output shaft, and the input end of the transmission input shaft is located on the same side of the housing as the transmission output shaft.

14. The planetary transmission according to claim 1 where the electric machine radially encloses the first planetary gear set the second planetary gear set, and at least one of the four unsynchronized shift elements, where the third planetary gear set, when connected to the transmission output shaft, is operable to connect to the electric machine shaft.

15. The planetary transmission according to claim 1 where the electric machine radially encloses and axially overlaps the second planetary gear set and third planetary gear sets and where the first planetary gear set, second planetary gear set, and third planetary gear set face the transmission output shaft, and where the electric machine shaft is directly or indirectly connected to the third sun gear.

16. The planetary transmission according to claim 3, where the power shift element is a friction shift element.

17. The planetary transmission according to claim 1, where the electric machine radially encloses the first planetary gear set the second planetary gear set, and at least one of the four unsynchronized shift elements, and where the third planetary gear set, when connected to the transmission output shaft, is connected to the electric machine shaft.

\* \* \* \* \*